(12) United States Patent
Goldberg et al.

(10) Patent No.: US 10,970,550 B1
(45) Date of Patent: Apr. 6, 2021

(54) SYSTEMS AND METHODS FOR STREAM RECOGNITION

(71) Applicant: Geenee GmbH, Berlin (DE)

(72) Inventors: Alexander Goldberg, Los Angeles, CA (US); Austin Castelo, Los Angeles, CA (US); Matthias Emanuel Thömmes, Berlin (DE); Mats Krengel, Berlin (DE); Davide Mameli, Berlin (DE); Andrii Tkachuk, Berlin (DE)

(73) Assignee: Geenee GmbH, Berlin (DE)

( * ) Notice: Subject to any disclaimer, the term of this patent is extended or adjusted under 35 U.S.C. 154(b) by 0 days.

(21) Appl. No.: 16/815,816

(22) Filed: Mar. 11, 2020

Related U.S. Application Data

(60) Provisional application No. 62/961,116, filed on Jan. 14, 2020.

(51) Int. Cl.
  *G06K 9/00* (2006.01)
  *G06K 9/62* (2006.01)
  *G06N 3/04* (2006.01)
  *G06N 3/08* (2006.01)

(52) U.S. Cl.
  CPC ...... *G06K 9/00671* (2013.01); *G06K 9/00711* (2013.01); *G06K 9/6201* (2013.01); *G06K 9/6219* (2013.01); *G06K 9/6227* (2013.01); *G06K 9/6257* (2013.01); *G06K 9/6264* (2013.01); *G06N 3/04* (2013.01); *G06N 3/08* (2013.01)

(58) Field of Classification Search
  None
  See application file for complete search history.

(56) References Cited

U.S. PATENT DOCUMENTS

| 7,707,131 B2 | 4/2010 | Chickering et al. |
| 8,238,424 B2 | 8/2012 | Chang et al. |
| 10,108,863 B2 | 10/2018 | Miller et al. |

(Continued)

FOREIGN PATENT DOCUMENTS

WO  WO 2018/125261  7/2018

OTHER PUBLICATIONS

Baker et al. "Designing Neural Network Architectures Using Reinforcement Learning", published as a conference paper at ICLR 2017.

*Primary Examiner* — Nurun N Flora
(74) *Attorney, Agent, or Firm* — Finnegan, Henderson, Farabow, Garrett & Dunner, LLP

(57) ABSTRACT

The present disclosure provides systems and methods for providing augmented reality experiences. Consistent with disclosed embodiments, one or more machine-learning models can be trained to selectively process image data. A pre-processor can be configured to receive image data provided by a user device and trained to automatically determine whether to select and apply a preprocessing technique to the image data. A classifier can be trained to identify whether the image data received from the pre-processor includes a match to one of a plurality of triggers. A selection engine can be trained to select, based on a matched trigger and in response to the identification of the match, a processing engine. The processing engine can be configured to generate an output using the image data, and store the output or provide the output to the user device or a client system.

24 Claims, 5 Drawing Sheets

(56) References Cited

U.S. PATENT DOCUMENTS

| | | | |
|---|---|---|---|
| 10,108,876 B2 | 10/2018 | Shtok et al. | |
| 10,140,492 B1 * | 11/2018 | Nair | G06K 7/10861 |
| 10,296,806 B2 | 5/2019 | Shtok et al. | |
| 10,402,983 B2 | 9/2019 | Schulter et al. | |
| 10,410,321 B2 | 9/2019 | Ilic et al. | |
| 10,452,950 B2 | 10/2019 | Kobori et al. | |
| 10,453,197 B1 | 10/2019 | Cholakkal et al. | |
| 2019/0236487 A1 * | 8/2019 | Huang | G06N 20/00 |
| 2020/0017117 A1 * | 1/2020 | Milton | B60W 50/02 |
| 2020/0019628 A1 * | 1/2020 | Chen | G06F 16/50 |
| 2020/0143797 A1 * | 5/2020 | Manoharan | G10L 15/16 |

* cited by examiner understand # SYSTEMS AND METHODS FOR STREAM RECOGNITION

RELATED APPLICATION

This application claims the benefit of priority of U.S. Provisional Application No. 62/961,116, filed Jan. 14, 2020, which is incorporated herein by reference in its entirety.

TECHNICAL FIELD

The present disclosure relates to systems and methods for providing augmented reality experiences using multiple machine-learning models.

BACKGROUND

Augmented reality applications are limited in the triggers they can detect, the content they provide in response to detected triggers, and the manner in which such content is provided to users. Such applications may detect a limited set of triggers in image data obtained by user devices, such as QR codes, bar codes, or the like. Furthermore, such applications may only provide a limited range of augmented reality content associated with a particular provider. Augmented reality applications may be provided as downloadable applications, which may reduce user interest, as users may be unwilling to download another application—particularly one providing a limited range of content. Furthermore, content providers may find development of such applications difficult, as they may need to create the entire framework for providing the augmented reality experience. Furthermore, the extent and complexity of the augmented reality experience provided by such applications may be limited by the processing power of the typical (or worst-case) user device.

SUMMARY

The disclosed embodiments include a system for training a machine learning model. The system can include a hierarchical classifier, a secondary classifier, and a trainer. The hierarchical classifier can be configured to determine whether image data received from the user device includes a match to one of a plurality of triggers. The hierarchical classifier can include a segmentation model, a general classifier, and a specific classifier. The segmentation model can be configured to generate a segment of the image data including a potential trigger. The general classifier can be configured to associate the segment with an identified one of a plurality of general classes. The specific classifier can correspond to the identified general class and can be configured to associate the segment with the one of the plurality of triggers. The hierarchical classifier can be configured to determine that the image data includes the match when the association between the segment and the one of the plurality of triggers satisfies a match condition. The secondary classifier can be configured to determine whether the image data includes the match. The trainer can be configured to train the specific classifier using the segment when the secondary classifier determines that the image data includes the match and the hierarchical classifier determines that the image data does not include the match.

In some embodiments, the hierarchical classifier can be configured to determine that the image data includes a potential match based on the association between the segment and the one of the plurality of triggers, and the secondary classifier can be configured to determine whether the image data received from the user device includes the match based at least in part on the determination of the potential match.

In various embodiments, the general classifier and the secondary classifier can comprise convolutional neural networks. The secondary classifier can be configured to use keypoint matching to determine whether the image data includes the match.

In some embodiments, the match can comprise an object. The system can comprise a pose estimation model corresponding to the specific classifier, and the pose estimation model can be configured to generate training data, in response to a determination by the hierarchical classifier that the image data includes the match, by tracking the object in a video stream including the image data. The trainer can be configured to train the specific classifier using the training data.

In various embodiments, the pose estimation model can be configured to generate the training data, as least in part, by segmenting the object in a frame of the image data. The trainer can be configured to generate specific classifiers in response to client input using a reinforcement learning model trained to generate classifier hyperparameters using a reward function based on classifier accuracy.

In various embodiments, the system can comprise a pre-processor configured to automatically determine whether to select and apply a preprocessing technique to the image data before providing the image data to the hierarchical classifier. The pre-processor can comprise a reinforcement learning model, and the trainer can be configured to train the pre-processor using a reward function based on a success or failure of the hierarchical classifier in identifying the match. The reward function can be based on a time required to identify the match.

In some embodiments, the system can comprise a selection engine configured to select, based on the match and in response to the identification of the match, a processing engine to generate an output from the image data. The trainer can be configured to train the selection engine using a reward function based on a degree of engagement of with provided outputs.

In various embodiments, the system can be configured to store the image data when the secondary classifier or the hierarchical classifier determines that the image data includes the match.

The disclosed embodiments further include a system for selectively processing image data. The system can include a pre-processor, a classifier, and a selection engine. The pre-processor can be configured to receive image data provided by a user device and automatically determine whether to select and apply a preprocessing technique to the image data. The classifier can be configured to identify whether the image data received from the pre-processor includes a match to one of a plurality of triggers. The selection engine can be configured to select, based on the matched trigger and in response to the identification of the match, a processing engine. The processing engine can be configured to, in response to a selection of the processing engine, generate an output using the image data and provide the output to the user device or a client system.

In some embodiments, the preprocessing technique can include at least one of denoising the image data, deblurring the image data, convolving the image data with a mask, applying the image data to an image enhancement machine learning model, or enhancing a resolution of the image data. The machine learning model can comprise a neural network.

In various embodiments, the processing engine can provide at least one of object pose estimation, object detection, object classification, object recognition, three-dimensional world reconstruction, three-dimensional object reconstruction, optical character recognition, object tracking, world tracking, or image recognition. The processing engine can provide a payment application programing interface. The processing engine can be configured to provide instructions to modify a user interface of the user device for displaying the output.

In some embodiments, one or more of the plurality of triggers can be specified by a client system. The one of the plurality of triggers can be associated with at least one image, video, or object file provided by a client system, and the classifier can be trained using the at least one image, video, or object file to identify the matched trigger by detecting a match to the at least one image, video, or object file.

In various embodiments, the image data can be received from and the output provided to an application running on the user device. The application can comprise a web browser. In some embodiments, the system can comprise a control engine configurable, in response to instructions received from a client system, to specify the selection of the processing engine in response to matching the one of the plurality of triggers. The system can be configured to provide the classifier to the user device for offline detection of triggers when a latency criterion for communications between the user device and the system is satisfied.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Figure 1:
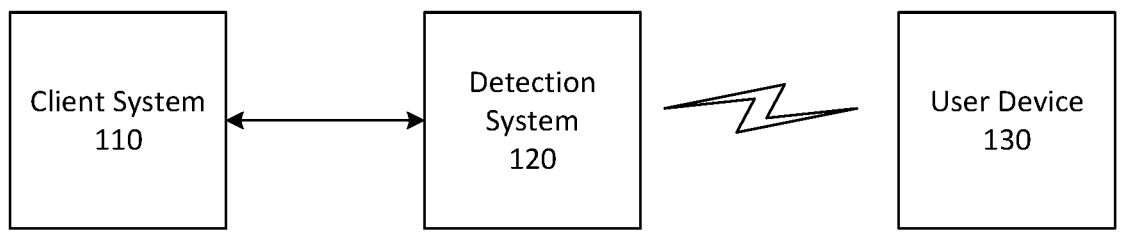
FIG. 1 depicts an exemplary stream recognition system, consistent with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added or steps may be removed without departing from the envisioned embodiments. Thus, the materials, methods, and examples are illustrative only and are not intended to be necessarily limiting.

The disclosed embodiments include systems and methods that use multiple machine learning models to generate outputs in response to acquisition of image data by a user device. In some embodiments, a hierarchical classifier can be trained to recognize triggers in the image data. A secondary classifier can also be configured to recognize triggers in the image data. When the secondary classifier recognizes a trigger in the image data but the hierarchical classifier does not, the image data can be used to train the hierarchical classifier. Image data can be preprocessed before submission to the hierarchical classifier or secondary classifier. A machine learning model can be trained to select the preprocessing techniques applied. This machine learning model can also be trained to recognize image data unlikely to be recognized and discard such data without submitting it to the hierarchical classifier or secondary classifier. An output can be provided in response to recognition of a trigger in the image data. The output can be selected based on the trigger or can be generated by applying a selected toolset to the image data. A machine learning model can be trained to select the output or select the toolset applied to the image data.

The disclosed embodiments provide multiple technical improvements over existing recognition systems. Triggers can be provided by a client system, allowing the system to be flexibly adapted to various uses. The hierarchical classifier can be trained using information from, for example, the secondary classifier or the client system, leading to faster and more accurate classification over time. The selection of an appropriate preprocessing technique can be learned to reduce resource-intensive operations, thereby increasing the efficiency of the system. Similarly, unsuitable data can be learned to be discarded prior to classification, reducing the time needed for recognition. The selection of an appropriate output to the user device can also be learned, leading to a more tailored and enjoyable user experience. The output can be selected based on the trigger or can be generated by applying a selected toolset to the image data, allowing the system to be applied to a wide variety of applications. The selection of an appropriate output to the user device can also be configured to be trigger-specific, increasing the system's predictability. The disclosed embodiments can perform the recognition process using an application running on the user device, such as a platform-independent browser environment, thus allowing the recognition system to be available to more users than systems that rely on specific hardware, specific Application Programming Interfaces, or applications that must be downloaded onto the user device. Furthermore, an object can be used as a trigger for displaying content to the client device, in place of express triggers such as QR codes or the like, which may appear artificial to users and therefore may diminish the user experience.

FIG. 1 depicts an exemplary system 100 for stream recognition, consistent with disclosed embodiments. System 100 can include a client system 110, a detection system 120, and a user device 130. Detection system 120 can be configured to receive image data obtained by user device 130. One or more client systems (e.g., client system 110) can interact with detection system 120, configuring detection system 120 to recognize triggers in image data and generate outputs in response. Accordingly, as described herein, system 100 can provide a sophisticated stream recognition service and a low-latency user experience to a device with limited computing capabilities or limited network connection.

Client system 110 can be configured to provide and receive data or instructions from detection system 120 or user device 130. Client system 110 can include a computing device, a computer, a server, a server cluster, a plurality of clusters, or a cloud service. For example, client system 110 can include one or more resources hosted on at least one cloud-computing platform.

In some embodiments, client system 110 can be a scalable system configured to provide information to detection system 120 to recognize triggers and generate outputs in response, allowing for a customizable system that can be adapted to various needs. For example, client system 110 can be configured to provide one or more images of a cereal box to be recognized by detection system 120 as triggers, and which can be further configured to provide augmented reality content to be displayed by user device 130 upon a successful recognition of one of the images of the cereal box. In various embodiments, client system 110 can be configured to provide information for detection system 120 to use in conjunction with one or more machine learning models to learn to recognize triggers more effectively and accurately over time. For example, client system 110 can be configured to provide an initial set of images depicting a trigger, which detection system 120 can then use to learn to recognize that trigger using a convolutional neural network. As an additional example, client system 110 can provide information specifying a machine learning model (e.g., specifying use of a convolutional neural network having a particular sequence of layers, initialized and trained in a particular way) or parameters of a machine learning model (e.g., the weights and biases of a convolutional neural network trained to detect the object).

User device 130 can be configured to acquire image data, consistent with disclosed embodiments. The image data can include one or more still images, video data, or the like. User device 130 can include a camera or be communicatively connected to a camera device (e.g., a webcam, digital video camera, action camera, or the like) using a wired (e.g., USB or the like) or wireless (e.g., WIFI, Bluetooth, or the like) connection. For example, user device 130 can include a camera capable of acquiring single images, sequences of images, or videos. In some embodiments, user device 130 can be a mobile device, such as a wearable device (e.g., a smartwatch, headset, or the like), smartphone, tablet, laptop, digital video camera, action camera, or the like.

User device 130 can be configured to communicate with detection system 120 or client system 110 over a wireless or a wired communication network. User device 130 can be configured to provide image data to detection system 120 using a platform-independent application, such as a web browser. User device 130 can be configured to receive outputs from detection system 120 using the platform-independent application. For example, user device 130 can enable a web browser to access a camera communicatively connected to user device 130. The web browser can provide image data acquired by the camera to detection system 120 and receive outputs in response.

User device 130 can be configured to display output received from detection system 120, consistent with disclosed embodiments. In various embodiments, user device 130 can include a display or be communicatively connected to a display device. For example, user device 130 can have a built-in display or can be configured to communicate with a display device (e.g., a television, computer monitor, a remote computing device having a built-in monitor, or the like) using a wired (e.g., HMDI, DVI, Ethernet, or the like) or wireless (e.g., WIFI, Bluetooth, or the like) connection. The output can include augmented reality content associated with a recognized trigger. In some embodiments, user device 130 can be configured to integrate the augmented reality content with image data acquired by user device 130, and the resulting combined image data can be displayed by user device 130. To continue the cereal box example above, when the image data includes a cereal box, which is a trigger for displaying augmented reality content provided by the manufacturer of the cereal, user device 130 can be configured to display the augmented reality content together with the image of the cereal box.

The disclosed embodiments are not limited to embodiments in which trigger detection is performed by detection system 120. In some embodiments, detection system 120 can provide an offline detection package to user device 130. The offline detection package can be provided to user device 130 in response to a determination by detection system 120 or user device 130 that the network connecting detection system 120 and user device 130 fails to satisfy some adequate performance criterion. The offline detection package can enable user device 130 to detect triggers in image data without sending the image data to detection system 120. For example, detection system 120 can provide multiple machine learning models to user device 130 (e.g., one or more of a pre-processor, hierarchical classifier, secondary classifier, selection engine, or the like). As described herein, the multiple machine learning models can be used to detect whether image data matches a trigger. In some embodiments, user device 120 can provide an indication of a detected trigger to detection system 130, which can respond with an appropriate output. In various embodiments user device 120 can request specific output from detection system 130, in response to a detected trigger.

The disclosed embodiments are not limited to embodiments in which outputs are received from detection system 120. In some embodiments, user device 130 can be configured to provide and receive data or instructions from detection system 120 or client system 110. For example, detection system 120, in response to detection of a trigger, can provide instructions redirecting user device 130 to client system 110 or otherwise instructing user device 130 to obtain content from client system 110.

Detection system 120 can be configured to receive image data from user device 130. The image data can be received through a wireless connection (e.g., as depicted in FIG. 1) or through a wired connection. Detection system 120 can be configured to determine whether the image data matches a trigger specified by client system 110. For example, detection system 120 can be configured to determine whether an object specified as a trigger is present in the image data.

Detection system 120 can be configured to receive information specifying one or more triggers from one or more client systems (e.g., client system 110), consistent with disclosed embodiments. A trigger can be a characteristic of image data that causes detection system 120 to perform a resulting action. For example, detection system 120 can be triggered to perform an action in response to determining that image data displays an object. The information specifying a trigger can include at least one image, video, or object file. In some embodiments, the information specifying the trigger can include information specifying the generation of an output in response to recognition of a trigger. In various embodiments, the information specifying the trigger may not include information specifying the generation of the outputs. Instead, detection system 120 can select the resulting actions.

Information specifying a trigger can include training data. Training data can include image data representative of image data matching the trigger. For example, when a determination that image data displays an object constitutes the trigger, the training data can include images of the object, three-dimensional models of object, or the like. In such embodiments, the object can be a thing of interest, such as a billboard, an item of clothing, or a scene that the user would like to learn more information about. The object can be a planar object, such as a billboard, magazine or book page, box, painting, wall, playing card, counter, floor, or the like. The object can also be a non-planar object, such as a beer bottle, car, body part (e.g., a face or part of a face), or the like.

Information specifying the trigger can include information specifying a model for recognizing the presence of the object. Information specifying a model can include a selection of an existing model or model type supported by detection system 120 (e.g., detection system 120 may be configurable for use with certain pre-existing models or model types and the information specifying a model can include a selection of one or more of these pre-existing models or model types). Information specifying a model can include information specifying a model architecture, model hyperparameters, or model parameters (e.g., specifying use of a convolutional neural network having a particular sequence of layers, initialized and trained in a particular way). Information specifying a model can include the parameters of a model (e.g., the weights and biases of a convolutional neural network trained to detect the object).

Information specifying the trigger can include information specifying an output provided in response to recognition of a trigger. As described herein, such an output can be selected or generated using the image data. Accordingly, client system 110 can provide instructions specifying selection of the content or instructions specifying generation of the output using the image data. For example, instructions specifying generation of the output can specify selection of a processing engine in response to the recognition of a trigger. The processing engine can perform functions related to, for example, pose estimation, optical character recognition, tracking, payment, object (e.g., image, video, face, or the like) recognition, or user redirection. These functions can be performed on image data received from user device 130 or an output associated with the recognized trigger. To continue the cereal box example above, a pose estimation engine can be activated in response to detection of the cereal box. The pose estimation engine can be configured to determine, using image data received from user device 130, a pose of the cereal box in the image data. Detection system 120 can then determine, using the pose of the cereal box, an appropriate orientation, scaling, or perspective of augmented reality content displayed together with the cereal box. Accordingly, when the user moves with respect to the cereal box, the orientation, scaling, or perspective of augmented reality content also changes in a consistent manner, providing a more realistic and enjoyable user experience.

In some embodiments, user device 130 can perform time-sensitive operations, such as responding to user interactions with the platform-independent application, while detection system 120 can perform computationally complex operations. Such a division of labor can increase the responsiveness and flexibility of system 100. Furthermore, such a division of labor can reduce the hardware or processing requirements of user device 110.

Figure 2:
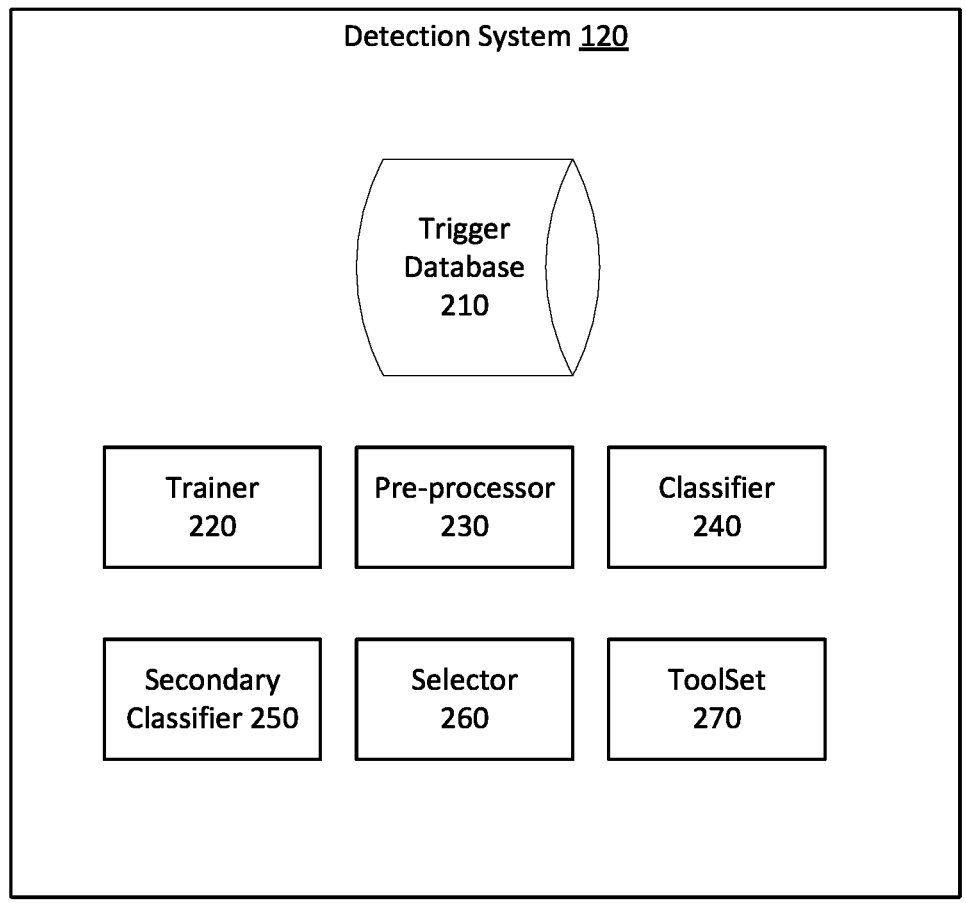
FIG. 2 depicts an exemplary detection system, consistent with disclosed embodiments.

FIG. 2 depicts an exemplary detection system 120, consistent with disclosed embodiments. In some embodiments, detection system 120 can include a trigger database 210, a trainer 220, a pre-processor 230, a classifier 240, a secondary classifier 250, a selector 260, and a toolset 270. Envisioned embodiments may include fewer components, additional components, or combine or redistribute disclosed functionality among components of detection system 120.

Trigger database 210 can be configured to include information specifying one or more triggers, consistent with disclosed embodiments. Information specifying a trigger can include images or three-dimensional models of an object. The object can be a thing of interest, such as a billboard, an item of clothing, or a scene that the user would like to learn more information about. The object can be a planar object, such as a billboard, magazine or book page, box, painting, wall, playing card, counter, floor, or the like. The object can also be a non-planar object, such as a beer bottle, car, body part (e.g., a face or part of a face), or the like.

Trigger database 210 can be configured to store information generated by detection system 120 or received from client system 110 or user device 130 of FIG. 1. In some embodiments, detection system 120 can generate images specifying a trigger by scraping from websites (e.g., when detection of a make and model of a car in image data constitutes a trigger, car dealership websites could be scraped for images of that make and model of car). The scraped images can be stored in trigger database 210. In various embodiments, detection system 120 can generate images specifying a trigger by requiring users to label images as part of an authentication system, thereby generating a stream of labeled images. These labeled images can be stored in trigger database 210. As a further example, when the presence of an object in image data constitutes a trigger and the object is detected in image data obtained from a user device, the object can be tracked in image data subsequently obtained from the user device. The subsequently obtained image data containing the object can be stored in trigger database 210. For example, when presence of a cereal box in an image constitutes a trigger and detection system 120 detects the cereal box in a video stream received from user device 130, detection system 120 can be configured to track the cereal box in subsequently received images in the video stream. Subsequent images including the cereal box can be stored in trigger database 210. Such images can be used to improve the robustness of classifier 240. For example, detection system 120 may detect an object in image data obtained under favorable imaging conditions (e.g., lighting, focus, perspective, occlusion of the object, or the like). In this example, detection system 120 may be unable to detect the object in image data obtained under less-favorable imaging conditions. However, detection system 120 may be able to track the object, once detected. Subsequently obtained image data may then be identified as containing the object, based on such tracking, and stored in trigger database 210. In some embodiments, detection system 120 can use a pose estimation model to segment the object from the image data obtained under less-favorable imaging conditions. The image data (or the segment of the image data) can then be used to train detection system 120 to detect the object under less-favorable imaging conditions.

Trainer 220 can be configured to generate machine learning models for use by detection system 120, consistent with disclosed embodiments. Trainer 220 can be configured to select or adjust model parameters and/or hyperparameters during training. For example, trainer 220 can be configured to modify model parameters and/or hyperparameters (i.e., hyperparameter tuning) using one or more optimization techniques during training. Hyperparameters may include training hyperparameters, which may affect how training of a model occurs, or architectural hyperparameters, which may affect the structure of a model (e.g., when the model is a convolutional neural network, the number of layers, type of layers, connectivity of layer, activation function, or the like). In some embodiments, optimization techniques used may include grid searches, random searches, gaussian processes, Bayesian processes, Covariance Matrix Adaptation Evolution Strategy techniques (CMA-ES), derivative-based searches, stochastic hill-climbing, neighborhood searches, adaptive random searches, or the like. In various embodiments, trainer 220 can use a reinforcement learning model to generate machine-learning models used by detection system 120. For example, when the machine-learning model is a convolutional neural network, the reinforcement learning model can be used to select hyperparameters, such as training or architectural hyperparameters, of the machine learning model. A reward function for the reinforcement learning model can depend on a output metric (e.g., classification accuracy, log loss, area under an ROC curve, a metric based on confusion matrices, precision, recall, or the like) or a resources metric (e.g., time required to identify a match, computing resource usage, or the like).

In some embodiments, trainer 220 can be configured to train classifier 240, pre-processor 230, or selector 260. As described herein, in some embodiments, classifier 240, pre-processor 230, or selector 260 can comprise one or more machine-learning models (e.g., convolutional neural networks, decision trees, or the like). Classifier 240 can be trained using one or more models generated using information stored in trigger database 210 (e.g., information received from a client system or generated by detection system 120, as described herein). In some embodiments, classifier 240 can be initially trained using image data received from client system 110. Consistent with disclosed embodiments, should secondary classifier 250 subsequently detect a match to a trigger in image data, when classifier 240 does not, the image data can be stored in trigger database 210. Trainer 220 can use the image data to retrain or update classifier 240. In this manner, detection system 120 can be structured to enable classifier 240 to learn from secondary classifier 250. Additionally, trainer 220 can use image data that has been altered, such as by zooming-in, flipping or rotating the image data around an axis, modifying values in the image data (e.g., randomly or deterministically altering brightness or color values, or the like), randomly or deterministically shifting image data, or applying a transform (e.g., an affine transform) to the image data. For example, trainer 220 can zoom-in, flip, rotate, modify, shift or transform image data stored in trigger database 210 and use it to train classifier 240. Accordingly, classifier 240 can learn from image data that has been altered to represent scenarios unlikely to be encountered by the user.

Moreover, consistent with disclosed embodiments, trainer 220 can use output generated by toolset 270 to train classifier 240, adding training data that might otherwise be difficult to obtain. For example, as discussed above, image data obtained by tracking an object matching a trigger can be used as training data. Additionally or alternatively, training data may be generated by tracking a real-world environment of an object matching a trigger. For example, toolset 270 may include a mapping algorithm (e.g., Simultaneous Localization and Mapping (SLAM), Visual Odometry (VO), or the like). Toolset 270 may apply this mapping algorithm to generate training data using the location or surroundings of an object matching a trigger. Additionally or alternatively, training data can be generated using text recognized in the image data by toolset 270. For example, the presence of a movie title, either alone or in combination with other elements (e.g., an image of a movie poster), in the image data may constitute a trigger. When classifier 240 fails to detect a match in such a case, the image data may be used as training data if the movie title is detected when toolset 270 performs optical character recognition (OCR) on the image data. Furthermore, training data may include image data where toolset 270 recognizes an object in the image data. For example, the face of a superhero, either alone or in combination with other elements (e.g., images contained in a movie poster), may constitute a trigger. In the case where classifier 240 fails to detect a match, the image data may be used as training data if the face is recognized by toolset 270 after performing a face recognition algorithm (e.g., Eigenface, Fisherface, Laplacianface, or the like). In this manner, trainer 220 can train classifier 240 using information other than classification data.

In some embodiments, as described herein, a likelihood or confidence value can be associated with a classification. Classifications with a likelihood or confidence value below a threshold can be flagged for human review, thereby generating labeled training data. Trainer 220 can be configured to use such labeled training data to update or retrain classifier 240, increasing the reliability and consistency of the training process.

Trainer 220 can also be configured to train pre-processor 230 using information received from classifier 240 and/or secondary classifier 250. For example, trainer 220 can train pre-processor 230 using an update function based at least in part on an output or resource metric of classifier 240 or secondary classifier 250. In this manner, trainer 220 can train pre-processor 230 to select preprocessing techniques resulting in, for example, more accurate and faster detection of triggers.

Trainer 220 can also be configured to train selector 260 using an update function based at least in part on user engagement information (e.g., dwell time on a webpage displaying output, clickthrough rate to related content, number of user interactions with displayed output, purchases arising from output, number or content of user queries, or the like). Such information can be received from user device 130 (e.g., dwell time on webpage displaying content, number of interactions with displayed output), client system 110 (e.g., clickthrough rate to related content, purchases arising from displayed output, or the like), or another system. In this manner, trainer 220 can train selector 260 to select processing engines for generating output that results in increased user engagement.

Pre-processor 230 can be configured to pre-process the image data prior to submission to classifier 240 or secondary classifier 250. In some embodiments, preprocessing can correct defects in the image data, increasing the likelihood of accurate or speedy classification. Pre-processor 230 can be configured to perform at least one of denoising the image data, deblurring the image data, convolving the image data with a mask, applying the image data to an image enhancement machine learning model, or enhancing a resolution of the image data (e.g., using a generative adversarial network for super-resolution processing). For example, in the event that the image data contains random inflections of brightness or color, pre-processor 230 can select a Gaussian filter to reduce the inflections. As an additional example, if the image data was acquired at nighttime under poor lighting conditions, pre-processor 230 can select a low-light enhancement algorithm to improve the visual details in the image data. In various embodiments, pre-processor 230 can recognize image data unlikely to be recognized and discard such data without submitting it to the classifier 240 and/or secondary classifier 250. For example, pre-processor 230 can discard image data that is too out-of-focus, too dark, or too high-contrast for detection of triggers.

In some embodiments, pre-processor 230 can comprise a machine learning model. The machine learning model can be trained to select at least one technique for preprocessing received image data. The selection can be based on characteristics of the received image data (e.g., focus, brightness, contrast, or the like). Consistent with disclosed embodiments, pre-processor 230 can apply at least one preprocessing technique prior to attempted detection of a match to a trigger using classifier 240 or secondary classifier 250. In some embodiments, pre-processor 230 can comprise a reinforcement learning model. The reinforcement learning model can be configured to maintain a context-action data structure that tracks the rewards received in each context for each preprocessing technique used. Context can include information about the image data (e.g., brightness, focus, contrast, or the like). The context-action data structure can store an expected reward for each preprocessing technique in each context. As a non-limiting example, pre-processor 230 can be configured to update this expected reward as follows:

$$R(\text{context}_k, \text{preprocessing technique}_j)_{i+1} = R(\text{context}_k, \text{preprocessing technique}_j)_i + \text{Update}_{i+1}$$

Where $R(\text{context}_k, \text{preprocessing technique}_j)_{i+1}$ is the value of the expected reward for preprocessing technique j in context k after update i+1, $R(\text{context}, \text{preprocessing technique}_j)_i$ is the value of the expected reward after update i, and $\text{Update}_{i+1}$ is the value of update i+1. As a further non-limiting example, pre-processor 230 can be configured to calculate the update as follows:

$$\text{Update}_{i+1} = a \times (R_{i+1} - R(\text{context}_k, \text{preprocessing technique}_j)_i)$$

Where $R_{i+1}$ is the reward received from the environment that prompts update i+1 and a is a scaling parameter taking values between zero and one. As a non-limiting example, $R_{i+1}$ may have a default value of 0, a value of −10 when a feedback indication indicates that classifier 240 and/or secondary classifier 250 failed to recognize a trigger after the application of a preprocessing technique, and a value of 1 when classifier 240 and/or secondary classifier 250 correctly recognize the trigger after the application of a preprocessing technique. The value of a may depend on the number of updates. For example, when a is the reciprocal of the number of updates, then $R(\text{context}_k, \text{preprocessing technique}_j)_{i+1}$ is the simple average of all rewards for preprocessing technique j in context k. When a is a fixed number, $R(\text{context}_k, \text{preprocessing technique})_{i+1}$ will emphasize more recent rewards over earlier rewards.

The contextual bandit can be configured to select preprocessing techniques based on the expected rewards for the preprocessing techniques. In some embodiments, the contextual bandit can be configured to select either a preprocessing technique that maximizes an expected reward in a context or select a random preprocessing technique. For example, the contextual bandit can be configured to select a preprocessing technique that maximizes an expected reward in the context with probability p or select another action with probability p/(m−1), where m is the number of available preprocessing techniques. In various embodiments, the contextual bandit can be configured to select a preprocessing technique using a softmax function:

$$P(\text{context}_k, \text{preprocessing technique}_j) = \frac{e^{R(\text{context}_k, \text{preprocessing technique}_j)_{i+1}}}{\sum_m e^{R(\text{context}_k, \text{preprocessing technique}_m)_{i+1}}}$$

As would be appreciated by one of skill in the art, other updating formulas are possible, and the disclosed embodiments are not intended to be limited to this particular update method.

Classifier 240 can be configured to detect a match in image data to a trigger specified in trigger database 210. The image data can be received from user device 130 of FIG. 1. In some embodiments, classifier 240 can comprise one or more machine learning models, such as convolutional neural networks, decision trees, or the like trained to detect the trigger in the image data. For example, classifier 240 can comprise a hierarchical classifier as described below with regards to FIG. 3. In some embodiments, classifier 240 can be configured to detect a match in the image data to a trigger using an object classification algorithm, such as Histogram of Oriented Gradients (HOG), Scale-Invariant Feature Transform (SIFT), Speeded Up Robust Feature (SURF), or the like. In some embodiments, when client system 110 specifies a trigger by providing at least one image, video, or object file, detecting that the image data matches the trigger can include detecting, by secondary classifier 240, that the image data matches the at least one image, video, or object file.

Secondary classifier 250 can be configured to determine whether a trigger in trigger database 210 is contained in the image data. In some embodiments, secondary classifier 250 can be configured to use keypoint matching to determine whether a trigger is contained in the image data. Keypoints can be points that have a well-defined position and can be detected in multiple similar representations of the same environment, under differing conditions (e.g., lighting, focal planes, or the like) and from differing perspectives. For example, corners of objects, line endings, points of maximal curvature, or isolated points of local intensity maxima or minima can serve as keypoints. Keypoints can be detected using an interest point detection algorithm, such as Features from Accelerated Segment Test (FAST), Harris, Maximally Stable Extremal Regions (MSER), or the like. Keypoints can be matched using an interest point matching algorithm, such as Brute-Force, Fast Library for Approximate Nearest Neighbors (FLANN), the Viola-Jones method, or the like. As an additional example, keypoints can be matched using a motion detection algorithm (e.g., Extracted Points Motion Detection, or the like) by detecting the change in position of a point of interest in the image data that corresponds to a point of interest in the trigger. It is to be understood, however, that embodiments of secondary classifier 250 are not limited to keypoint matching to determine whether a trigger is contained in the image data. For example, secondary classifier 250 may be configured to use a text recognition algorithm (e.g., Optical Image Recognition, or the like), a mapping algorithm (e.g., Simultaneous Localization and Mapping (SLAM), Visual Odometry (VO), or the like), or other algorithms to determine whether an object in the image data matches a trigger. For example, text may at least in part specify a trigger in trigger database 210. The text recognition algorithm can determine that the trigger is contained in the image data by identifying the text in the image data. As an additional example, a location may at least in part specify a trigger in trigger database 210. Secondary classifier 250 may be configured to use location information provided by client system 110 (e.g., geographic coordinates provided by a GPS system, cellular triangulation information, or the like) in determining whether a trigger is contained in the image data.

In some embodiments, when client system 110 specifies a trigger by providing at least one image, video, or object file, detecting that the image data matches the trigger can include detecting, by secondary classifier 250, that the image data matches the at least one image, video, or object file.

Selector 260 can be configured to select an appropriate output in response to the recognition of a trigger. The selected output can be based on the trigger or can be generated by applying a processing engine from toolset 270 to the image data. For example, one of several outputs associated with a trigger can be selected to be displayed by the user device upon a successful recognition of the trigger. As an additional example, selector 260 can redirect the user to a payment screen upon a successful trigger recognition using a payment application programming interface (API) in toolset 270. In this manner, the generated output can be tailored to the user, resulting in a more enjoyable user experience.

In some embodiments, selector 260 can comprise a machine learning model. The machine learning model can be a reinforcement learning model (e.g., similar to the reinforcement learning model described above with regards to pre-processor 230). This reinforcement learning model can be trained to select an appropriate output in response to detection of a match in the image data to a trigger. Selection of an appropriate output can include selection of the output or selection of a tool in toolbox 270 for processing the image data. For example, the reinforcement learning model can select, based on detection of a cereal box in a video stream received from a user device, augmented reality content for display in the video stream. The reinforcement learning model can also select a pose estimation engine for determining a pose of the cereal box in the video stream. The detected pose can then be used to generate instructions for displaying the augmented reality content in a correct position, orientation, or perspective with respect to the detected cereal box. In some embodiments, these instructions can be provided to the user device, together with the augmented reality content.

Selector 260 can be configured to select an appropriate output based on a context. The context can include the detected trigger or characteristics of the detected trigger, characteristics of user device 130, characteristics of a user associated with the user device 130, or the like. In some embodiments, characteristics of the detected trigger can include the provider of the trigger (e.g., car maker, cereal manufacturer, or the like), the intended audience, outputs associated with the trigger, or the like. In some embodiments, characteristics of the device can include a type of the device (e.g., tablet, smartphone, or desktop), a location of the device, a browsing history of the device, or like characteristics. In various embodiments, characteristics of the user can include user profile information (e.g., demographic, geographic, interest information, financial information, interaction history, or the like). Selector 260 can be configured to maintain a context-action data structure that tracks the rewards received in each context for each output selected for a specific trigger and/or user. As a non-limiting example, selector 260 can be configured to receive a negative reward value when a feedback indication indicates that the user failed to engage with a selected output, and a positive reward value when the user clicks on the selected output or otherwise engages with the selected output (e.g., by interacting with it for longer than a predetermined amount of time). Furthermore, selector 260 can be configured to emphasize more recent rewards over earlier rewards. In this manner, selector 260 can learn to select or generate outputs that are tailored to a particular context over time, leading to a system that is more likely to generate relevant and enjoyable outputs.

In some embodiments, selector 260 can include multiple models. Each model can correspond to a subset of user devices. The subsets can be defined based on geographic, demographic, or interest information. For example, a subset can be defined by user devices in a particular address, block, neighborhood, city, or country, or the like. As an additional example, a subset can be defined by a combination of geographical location, age, and interest. In such embodiments, select 260 can be configured to learn to select or generate outputs that are tailored to each subset.

In some embodiments, in addition to selection engine 260, detection system 120 can further include a control engine. The control engine can enable a client to specify generation of the output in response to detection of a match to a trigger. For example, the control engine can provide a user interface accessible to a client system (e.g., client system 110). By interacting with the user interface, a user can specify a processing engine to apply to the image data or output in response to a determination that the image data matches the trigger. In some embodiments, determination of a processing engine or manner of generating the output by the control engine can override, replace, or substitute for determination of a processing engine or manner of generating the output by selection engine 260.

In some embodiments, detection system 120 can further provide an application programming interface enabling a remote system to control responses to detection of triggers. For example, detection system 120 can provide an API enabling a client system to monitor detection system 120 for detection of triggers, gather information concerning the detected triggers, or provide output (e.g., augmented reality content) in response to detection of triggers. The application programming interface can allow clients to handle the business logic of responding to detection of triggers, increasing the flexibility and scalability of the system.

Toolset 270 can include multiple processing engines. The processing engines can perform functions related to, for example, pose estimation, optical character recognition (OCR), tracking, payment, object (e.g., image, video, face, or the like) recognition, or user redirection. For example, when a trigger comprises detection of an object in the image data, a pose estimation engine can be configured with a corresponding model of the object. According to known methods, the pose estimation engine can use the model to estimate the position and orientation of the object in the image data. The pose estimation engine can then attempt to track the object in subsequently received image data. In various embodiments, the optical character recognition can include neural-network based optical character recognition, which can include letter-level recognition or word-level recognition. In some embodiments, the optical character recognition can include computer-vision based approaches to character recognition. Detection system 120 can be configured to apply the image data (or selected output) to one or more processing engines in response to detection of a match to a trigger in the image data. For example, selector 260 can select application of a pose estimation algorithm to image data including an object. The pose estimation algorithm can estimate the position and orientation of the object. Detection system 120 can then provide instructions for overlaying augmented reality content on the image data such that it appears correctly positioned and oriented with respect to the object, thereby providing an improved user experience.

In some embodiments, detection system 120 can be configured to provide instructions to modify a user interface displayed on user device 130. Detection system 120 can provide such instructions in response to user engagement information. For example, when provision of the output includes causing user device 130 to display a URL, and user engagement information indicates that users are not selecting the URL, detection system 120 can be configured to provide instructions to make the URL more salient (e.g., by making it blink, or making it larger in the user interface). As an additional example, elements of the user interface (e.g., buttons, images, words, colors, or the like) may be deleted, diminished, and/or rearranged when the user engagement information indicates that the user interface is too complicated or cluttered. Similarly, elements of the user interface (e.g., buttons, images, words, colors, or the like) may be added, enlarged, and/or rearranged when the user engagement information indicates that the user interface is too simple or barren. As a further example, user interfaces associated with a trigger may be laid out according to multiple templates. When a trigger is detected, a user interface may be selected and used to lay out the user interface provided to the user. The relative frequency with which each of the multiple templates is selected can depend on user engagement information associated with each template. For example, a template may be selected more frequently when users are more likely to engage with user interfaces laid out according to that template. In some embodiments, such instructions can be provided by a processing engine of detection system 120 (e.g., together with the output itself).

Figure 3:
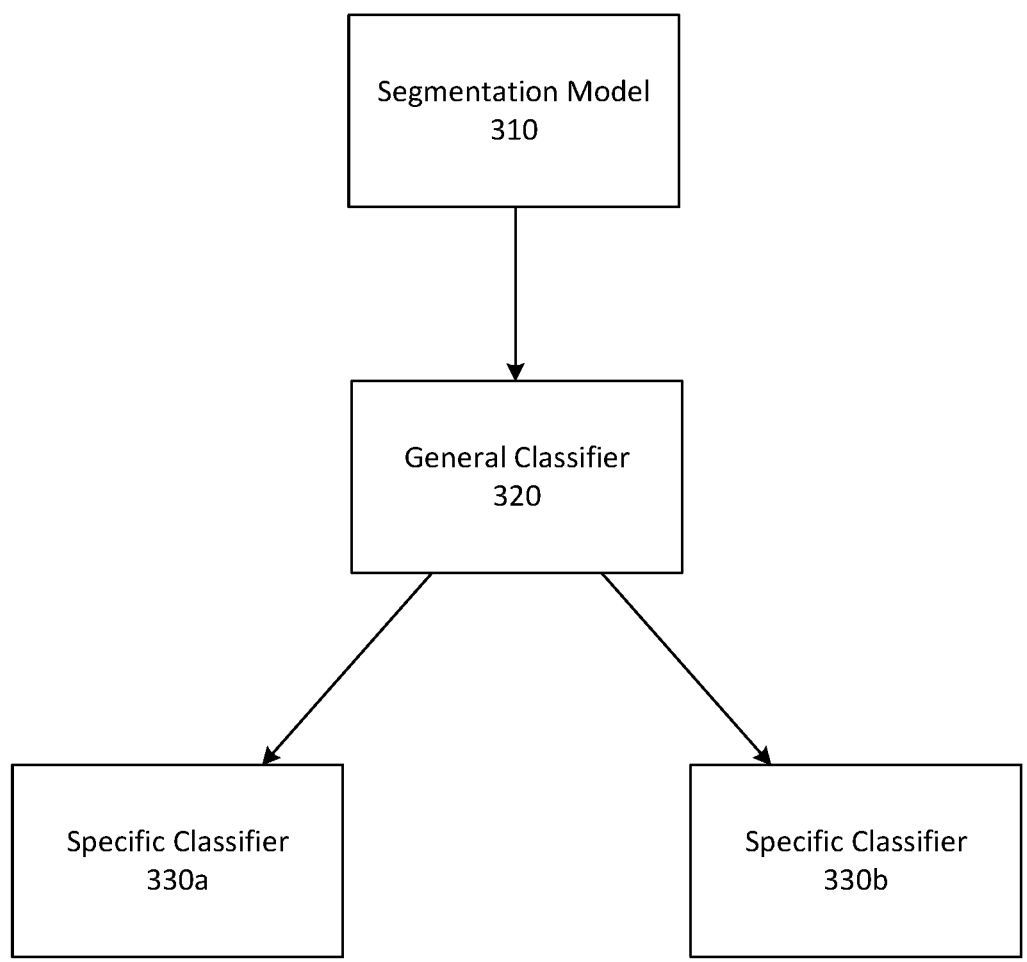
FIG. 3 depicts an exemplary hierarchical classifier, consistent with disclosed embodiments.

FIG. 3 depicts an exemplary hierarchical classifier 300 suitable for use in the classifier 240 of FIG. 2, consistent with disclosed embodiments. The hierarchical classifier can comprise a segmentation model 310 configured to generate a segment of the image data including a potential trigger, a general classifier 320 configured to associate the segment with a general class associated with the potential trigger, and a specific classifier (e.g., specific classifier 330*a* or 330*b*) corresponding to the general class and configured to associate the segment with a trigger. In this manner, the hierarchical classifier can be easily modified to recognize specific triggers, making the system adaptable to various needs.

Segmentation model 310 can be configured to generate a segment of the image data potentially matching a trigger. Segmentation model 310 can comprise one or more algorithms for detecting objects, including one or more machine learning methods (e.g., convolutional neural networks, decision trees, or the like) trained to generate segments of the image data potentially matching a trigger. For example, when the presence of an object in the image data can constitute a trigger, segmentation model 310 can comprise a region proposal algorithm (e.g., Region Proposal Network (RPN), Fast Region-Based Convolutional Neural Network (FRCN), or the like) trained to generate one or more proposed segments potentially matching a trigger based on an objectness score. The objectness score can be a metric indicating a likelihood that the image data includes a class of objects (e.g., billboard, box, car, body part, or the like) as opposed to non-objects (e.g., backgrounds, or the like). As a non-limiting example, when the image data depicts a car and one of the general classes is cars, segmentation model 310 may generate a greater objectness score for a segment of the image data depicting the car than for segments of the image data not depicting, or partially depicting, the car. Should the objectness score satisfy a criterion, such as a thresholding criterion, segmentation model 310 may propose the segment depicting the car as a region potentially matching a trigger. In various embodiments, segmentation model 310 can be configured to apply a filtering algorithm on the one or more proposed segments. For example, after generating several proposed segments of a billboard, segmentation model 310 can apply Non-Maximum Suppression (NMS) to select the proposed segment associated with the highest objectness score. The segment can then be provided to general classifier 320.

General classifier 320 can be configured to associate the segment generated by segmentation model 310 with one of a plurality of general classes. In some embodiments, detection system 120 can be configured to update a bounding box of the segment in the image data with a class label when general classifier 320 associates that segment with that class (e.g., labeling the bounding box with the class label "car," "cereal box," or the like). A bounding box can be a series of coordinates of a border that fully encloses the part of the segment likely to contain a trigger. In various embodiments, general classifier 320 can be configured with a "no classification" output in addition to the plurality of general classes.

General classifier 320 can be configured to accept the segment as an input and output a confidence or probability value for each of the general classes or the "no classification" output. The confidence or probability value for a general class can indicate a likelihood that the segment depicts an object belonging to that general class. In some embodiments, the greater the value, the more likely the segment depicts an object belonging to the general class. In various embodiments, general classifier 320 can be configured to associate the segment with one or more of the most likely general classes or "no classification" output, based on the confidence or probability values for the general classes and "no classification" output; with one or more of the general classes or "no classification" output having a confidence or probability value exceeding a threshold; or with one or more of the most likely general classes or "no classification" output having confidence or probability values exceeding the threshold.

General classifier 320 can include at least one machine-learning model (e.g., a convolutional neural network, decision tree, or the like) in some embodiments. General classifier 320 can perform an object classification algorithm (e.g., Histogram of Oriented Gradients (HOG), Scale-Invariant Feature Transform (SIFT), Speeded Up Robust Feature (SURF), or the like) in various embodiments.

Classifier 240 can include one or more specific classifiers (e.g., specific classifier 330*a* and specific classifier 330*b*). One or more of the general classes can each correspond to a specific classifier. In some embodiments, the "no classification" output of general classifier 320 may not correspond to a specific classifier. Classifier 240 can be configured to apply a segment to one or more specific classifiers when general classifier 320 associates the segment with one or more corresponding general classes. Each specific classifier can be configured to associate the segment with outputs including a "no classification" output and outputs corresponding to triggers (e.g. a subset of the triggers specified in trigger database 210). The triggers can relate to the general class corresponding to the specific classifier. For example, when the general class is cars, the triggers can constitute the presence of specific cars in the segment. The outputs can have confidence or probability values. The confidence or probability value for the "no classification" category can indicate a likelihood that the segment depicts an object unclassifiable by that specific classifier. The confidence or probability values for the outputs corresponding to triggers can indicate a likelihood that the segment matches that trigger. In some embodiments, the greater the confidence or probability value for an output, the more likely the segment matches the trigger corresponding to that output (or, regarding the "no classification" output, cannot be matched to any trigger). In various embodiments, general classifier 320 can be configured to associate the segment with the most likely output, based on the confidence or probability values. In some embodiments, detection system 120 can be configured to update a bounding box for the segment in the image data with a label associated with the most-likely output (e.g., a "no classification" label or a label indicating one of the triggers). Consistent with disclosed embodiments, trainer 220 can be configured to generate specific classifiers in response to client input (e.g., the receipt of information specifying triggers from client system 110).

As a non-limiting example, one of the general classes can be "cars" and trigger database 210 can include information specifying that the presence of a Tesla Model 3 in a segment constitutes a first trigger and the presence of a Chevy Bolt in a segment constitutes as second trigger. To continue this example, when the segment depicts a kitten, misclassified by general classifier 320 as a car, the specific classifier can determine confidence or probability values indicating a greater likelihood of "no classification" than of the segment depicting a Tesla Model 3 or a Chevy Bolt. Similarly, when the segment depicts a Toyota Corolla and trigger database 210 does not include information specifying that the presence of a Toyota Corolla in a segment constitutes a third trigger, the specific classifier may determine confidence or probability values indicating a greater likelihood of "no classification" than of the segment depicting a Tesla Model 3 or a Chevy Bolt. When the segment depicts a Chevy Bolt, the specific classifier may determine confidence or probability values indicating a greater likelihood that the segment depicts a Chevy Bolt than that the segment depicts a Tesla Model 3 or has "no classification."

General classifier 320 can include at least one machine-learning model (e.g., a convolutional neural network, decision tree, or the like) in some embodiments. General classifier 320 can perform an object classification algorithm (e.g., Histogram of Oriented Gradients (HOG), Scale-Invariant Feature Transform (SIFT), Speeded Up Robust Feature (SURF), or the like) in various embodiments.

As can readily be appreciated, classifier 240 is not limited to two layers of classification. In some embodiments, one or more progressively more specific classifiers can be used to associate a segment with a trigger. For example, a general classifier can determine that a segment depicts a car, a first specific classifier can identify a make, and a third specific classifier can identify a model, the presence of which can constitute a trigger. In various embodiments, specific classifiers may be used in parallel. For example, two or more specific classifiers can be used to classify segments associated with one general class.

The hierarchical structure described with regards to FIG. 3 can increase the flexibility and scalability of detection system 120. When information specifying new triggers is added to trigger database 210, trainer 220 may only need to retrain the specific classifier corresponding to the new trigger. For example, when the new trigger is the presence of a particular type of car in the image data, trainer 220 may only need to retrain the specific classifier corresponding to the class "cars". When two or more classifiers are trained to classify segments associated with one general class, only one of the two or more classifiers may require retraining. In either case, specific classifiers corresponding to other classes may not require retraining. Similarly, unless the new trigger corresponds to a previously unhandled general category, general classifier 320 may not require retraining. In some embodiments, a hierarchical structure may reduce training time by facilitating transfer learning. For example, general classifier 320 can be used to initialize a specific classifier (e.g., a classifier for cars). The specific classifier can then be used to initialize a more specific classifier (e.g., a classifier for models of cars). To continue this example, when the classifiers are convolutional neural networks, the more general classifier can be used to initialize weights for one or more layers of the more specific classifier.

Figure 4:
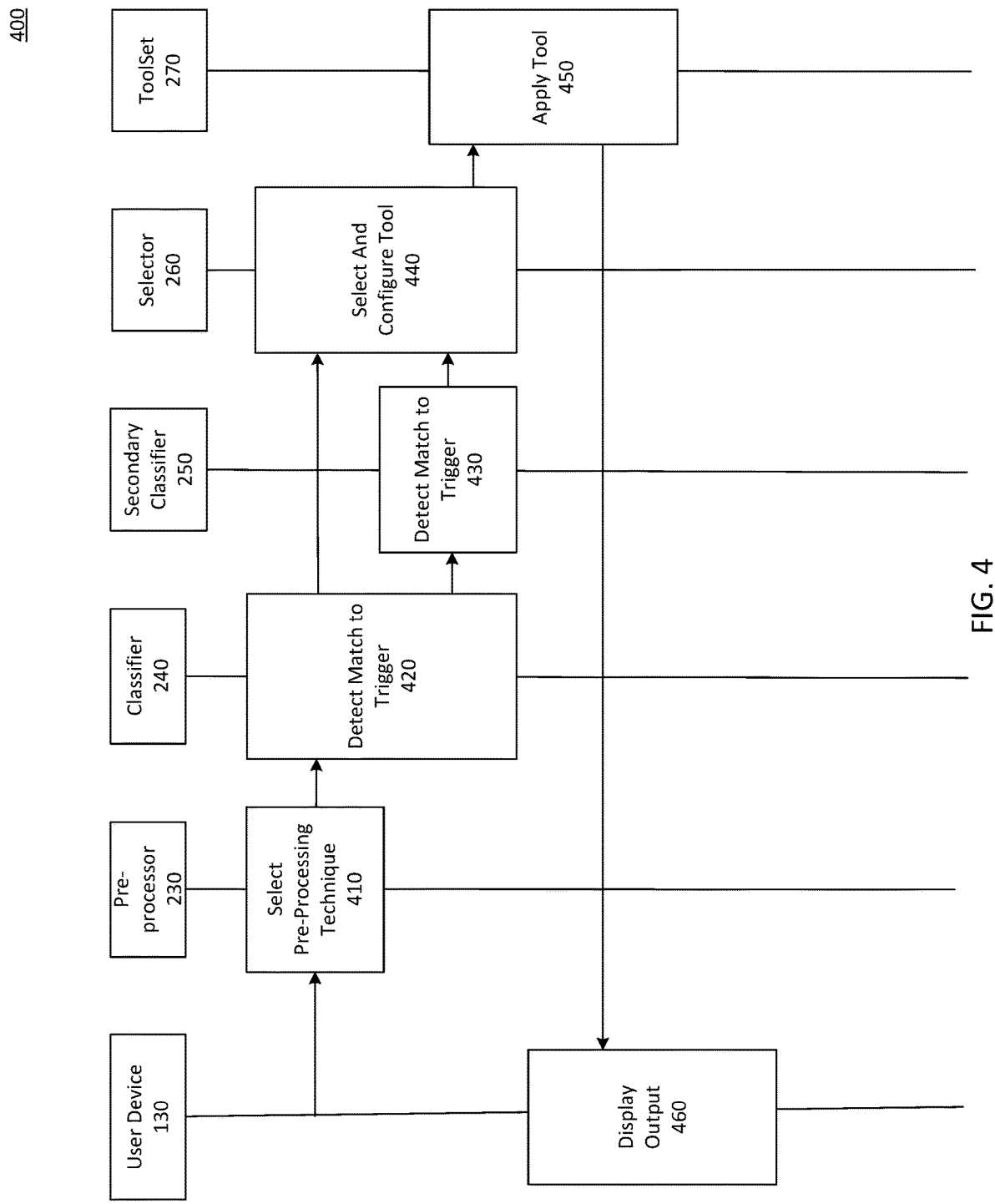
FIG. 4 depicts an exemplary method for selectively processing image data, consistent with disclosed embodiments.

FIG. 4 depicts an exemplary method 400 for selectively processing image data, consistent with disclosed embodiments. Method 400 can include operations of selecting a preprocessing technique to be applied to the image data, increasing the efficiency of other operations involving the image data (e.g., trigger detection, tool application, or the like). Method 400 can also include operations for recognizing triggers in the image data, allowing for the identification of desired objects. Furthermore, method 400 can include operations for selecting an output generated by applying a tool to the image data, resulting in a desired output to be displayed to the user. In this manner, the image processing method can generate desired outputs that are relevant and enjoyable for the user. Envisioned embodiments may include fewer operations, additional operations, or combine or redistribute disclosed functionality among operations of method 400.

In step 410, a pre-processor 230 can be configured to preprocess image data acquired by user device 130. Preprocessing the image data can include one of denoising the image data, deblurring the image data, convolving the image data with a mask, applying the image data to an image enhancement machine learning model, or enhancing a resolution of the image data. For example, when user device 130 acquires an image of a billboard at night in the dark, pre-processor 230 can apply a low-light enhancement technique. Other techniques of preprocessing image data may be used, and the disclosed embodiments are not limited to a particular method.

In step 420, a classifier 240 can be configured to detect a match between a trigger and the image data preprocessed by pre-processor 230. To continue the billboard example above, when the billboard in the image data is a trigger, classifier 240 can detect that a match exists between the preprocessed image data and an image of the billboard provided by the billboard owner using convolutional networks. As described above, the classifier can be a hierarchical classifier. The hierarchical classifier can use a segmentation model to generate a segment of the image data including a potential trigger. The hierarchical classifier can use a general classifier to associate the segment with a general class. Based on this association, the hierarchical classifier can apply the segment to one or more specific classifiers. When an output of the one or more specific classifiers satisfies a match condition, the hierarchical classifier can determine that the segment matches the trigger associated with the output (or matches the "no classification" output). The most likely of the specific outputs, based on confidence or probability values for the outputs, can be the output satisfying the match condition. In some embodiments, satisfying the match condition may require, for an output associated with a trigger, that confidence or probability value for the output exceed a predetermined threshold.

In step 430, secondary classifier 250 can be configured to detect a match between a trigger and the image data pre-processed by pre-processor 230. Consistent with disclosed embodiments, secondary classifier 250 can use a different approach to detect the match. For example, when classifier 240 includes the hierarchical classifier described with regards to FIG. 3, secondary classifier 250 can be configured to detect a match using keypoint generation (e.g., Features from Accelerated Segment Test (FAST), Harris, Maximally Stable Extremal Regions (MSER), or the like) and keypoint matching (e.g., Brute-Force, Fast Library for Approximate Nearest Neighbors (FLANN), the Viola-Jones method, or the like). To continue the billboard example above, when the billboard in the image data is a trigger, classifier 410 can detect that a match exists between the preprocessed image data and an image of the billboard provided by the billboard owner using keypoint matching.

Consistent with disclosed embodiments, step 430 may be performed when classifier 240 associates image data with a "no classification" label (e.g., when classifier 240 is unable to classify the image data). In such embodiments, when secondary classifier 250 is able to detect a match between the image data and a trigger, detection system 120 can be configured to use the image data for further training of classifier 240. In this manner, detection system 120 can benefit from multiple approaches to classification. Furthermore, as secondary classifier 250 may embody expertise and "lessons learned", using secondary classifier 250 to generate training data for classifier 240 can enable recovery of any investment in developing secondary classifier 250.

In some embodiments, secondary classifier 250 can receive potential matches from classifier 240 in step 430. As described herein, classifier 240 can generate confidence or probability values for outputs corresponding to the triggers. When the confidence or probability values for all of the outputs (or, in some embodiments, all of the outputs other than the "no classification" output) fails to satisfy a match condition (e.g., by failing to exceed a threshold), classifier 240 may select potential matches based on the confidence or probability values for the outputs. For example, classifier 240 can select a number of triggers that correspond to the outputs (or, in some embodiments, outputs other than the "no classification" output) with the greatest confidence or probability values.

When secondary classifier 250 receives potential matches from classifier 240, secondary classifier 250 can determine whether the image data includes a match to a trigger based, at least in part, on the determination by classifier 240 of the potential matches. For example, secondary classifier can determine that the image data matches a trigger when both secondary classifier 250 and classifier 240 identify the trigger as a potential match (even when secondary classifier 250 would not otherwise consider the trigger a match). As an additional example, secondary classifier 250 can be param-eterized by the determined matches. For example, a probability that the image data matches a trigger, the trigger being associated with a general class, can be increased when the potential matches are associated with the same general class.

In step 440, a selector 260 can be configured to select an output in response to the recognition of the trigger in the image data by classifier 240 and/or secondary classifier 250. Selecting an output can include selecting and configuring a tool in toolset 270 to be applied to the image data or an output associated with the trigger. As described herein, selector 260 can include a reinforcement learning model trained to generate outputs using user engagement data received from client system 110, user device 130, or another system. To continue the billboard example above, selector 260 can select augmented reality content provided by the billboard owner upon a successful recognition, and configure a pose estimation model to be applied to the augmented reality content by toolset 270.

In step 450, when selected by selector 260, the selected tool can be used to generate the output. Generating the output can include performing functions related to pose estimation, optical character recognition, object recognition and tracking, three-dimensional world reconstruction (e.g., using simultaneous localization and mapping), three-dimensional object reconstruction, payment (e.g., using a payment API), or user redirection (e.g., redirecting a browser of user device 130 to another resource). To continue the billboard example above, toolset 270 can apply the pose estimation model to the augmented reality content, such that the augmented reality content can be correctly overlaid on a real-world environment acquired by the user device.

In step 460, user device 130 can be configured to display the output generated by toolset 270. The output can be displayed on user device 130. In some embodiments, user device 130 can receive the output (or data and instructions for displaying the output) from detection system 120. For example, user device 130 can receive augmented reality content and instructions for overlaying the augmented reality content on the image data. As an additional example, user device 130 can receive the image data already combined with the augmented reality content. As can be appreciated by those of skill in the art, the disclosed embodiments are not limited to a particular method of providing the output to user device 130. To continue the billboard example above, user device 130 can display the billboard together with the augmented reality content generated by toolset 270, such that the augmented reality content is overlaid on top of the billboard.

Figure 5A:
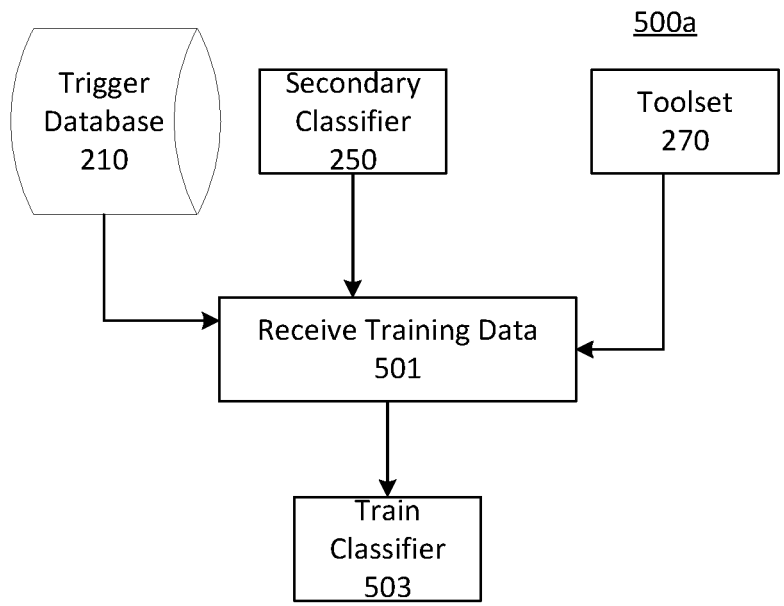
FIGS. 5A to 5C depict several exemplary methods for training a detection system, consistent with disclosed embodiments.
Figure 5B:
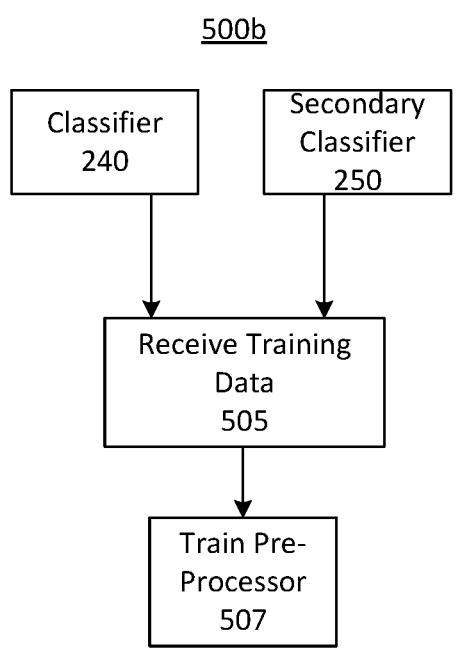
Figure 5C:
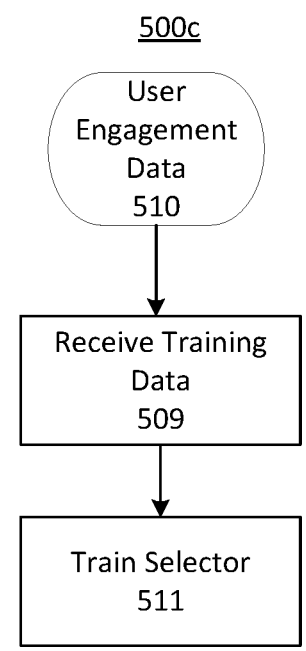

FIGS. 5A to 5C depict several exemplary methods for training a detection system, consistent with disclosed embodiments. Methods 500a, 500b, or 500c can include operations of assisting creation of, training, implementing, storing, receiving, retrieving, and/or transmitting one or more machine learning models to be used in the training of the detection system. In this manner, detection system 120 can become progressively more efficient and accurate.

As depicted in FIG. 5A, in accordance with method 500a, trainer 220 can train classifier 240. In step 501, consistent with disclosed embodiments, trainer 220 can receive information from trigger database 210, secondary classifier 250, or toolset 270. In step 503, trainer 220 can re-train or update classifier 240. In accordance with disclosed embodiments, such training can involve adjusting model parameters based on an output metric or a resource metric. As a non-limiting example, updating classifier 240 can include training or retraining a specific classifier (e.g., specific classifier 330a)

that determines whether a segment matches a trigger. In this non-limiting example, the specific classifier can be configured to select a trigger (or "no classification") based on confidence or probability values associated with outputs. The received information can be image data, which trainer 220 can provide to the specific classifier. For example, classifier 240 can be trained using images of a car corresponding to a trigger, provided by the maker of the car. Classifier 240 can also be trained using image data corresponding to the scenario where secondary classifier 250 determines that the image data includes a trigger but classifier 250 does not. For example, if secondary classifier 250 correctly recognizes that a billboard corresponding to a trigger is in the image data, but classifier 250 does not, then trainer 220 can store that image as training data. Classifier 240 can also be trained using output generated by toolset 270. For example, in response to a determination by classifier 240 and/or secondary classifier 250 that an image data includes an object matching to a trigger, toolset 270 can be configured to track the recognized object in a video stream. Image data in the video stream that includes the recognized object can be used as training data. For example, a pose estimation model can be applied to segment the recognized object out of the video stream. The segmented image can then be used to train classifier 240. Trainer 220 can determine a loss using a loss function based on the output of the specific classifier (e.g., using a cross-entropy loss function or other known loss function) and update the weights of the specific classifier based on the loss. In some embodiments, the loss function can incorporate a resource metric, as described herein.

As depicted in FIG. 5B, in accordance with method 500*b*, trainer 220 can train pre-processor 230. In step 505, trainer 220 can obtain training data. In some embodiments, the training data can include a success or failure rate of classifier 240 and/or secondary classifier 250 in identifying a match between image data and a trigger, or another output metric. In various embodiments, the training data can include the time required to perform classification, or another resource metric. In step 507, trainer 220 can train pre-processor 230 by adjusting model parameters of pre-processor 230 using the training data. Consistent with disclosed embodiments, pre-processor 230 can include a reinforcement learning model. A policy of the reinforcement learning model can be updated used a reward generated from the training data. For example, correct detection of a matched trigger after applying a preprocessing technique (or selecting no pre-processing) can increase a value of the reward, while incorrect detection or a failure to detect a matched trigger can decrease a value of the reward. Similarly, requiring longer than a threshold amount of time to detect a matched trigger can decrease a value of the reward.

As depicted in FIG. 5C, in accordance with method 500*c*, trainer 220 can train selector 260. In step 509, trainer 220 can receive user engagement data. Such user engagement data can be obtained by detection system 120 from client system 110, user device 130, or another system, consistent with disclosed embodiments. In step 509, trainer 220 can train selector 260 by adjusting model parameters of selector 260 using the training data. Consistent with disclosed embodiments, selector 260 can include a reinforcement learning model. A policy of the reinforcement learning model can be updated using a reward generated from the training data. Trainer 220 can train selector 260 using a reward function based on a degree of engagement by the user with provided outputs. For example, selector 260 can be trained to maximize the length of user interaction, the number of clicks by the user, or the like. In this manner, the detection system can learn user preferences over time.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that can incorporate hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems can control and schedule computer processes for execution, perform memory management, provide file system, networking, I/O services, and provide a user interface functionality, such as a graphical user interface ("GUI"), among other things.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps.

Furthermore, as used herein the term "or" encompasses all possible combinations, unless specifically stated otherwise or infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C. Similarly, the use of a plural term does not necessarily denote a plurality and the indefinite articles "a" and "an" do not necessary denote a single item, unless specifically stated otherwise or infeasible.

It is intended, therefore, that the specification and examples be considered as example only, with a true scope and spirit being indicated by the following claims and their full scope of equivalents.

What is claimed is:

1. A training system comprising:
a hierarchical classifier configured to determine whether image data received from a user device includes a match to one of a plurality of triggers, the match comprising an object wherein:
the hierarchical classifier includes:
a segmentation model configured to generate a segment of the image data including a potential trigger;
a general classifier configured to associate the segment with an identified one of a plurality of general classes; and
a specific classifier corresponding to the identified general class and configured to associate the segment with the one of the plurality of triggers; and
the hierarchical classifier is configured to determine that the image data includes the match when the association between the segment and the one of the plurality of triggers satisfies a match condition;
a secondary classifier configured to determine whether the image data includes the match;
a pose estimation model corresponding to the specific classifier, wherein the system is configured to generate training data using the pose estimation model, in response to a determination by the hierarchical classifier that the image data includes the match, by tracking the object in a video stream including the image data; and
a trainer configured to:
train the specific classifier using the training data, and
train the specific classifier using the segment when the secondary classifier determines that the image data includes the match and the hierarchical classifier determines that the image data does not include the match.

2. The system of claim 1, wherein:
the hierarchical classifier is configured to determine that the image data includes a potential match based on the association between the segment and the one of the plurality of triggers; and
the secondary classifier is configured to determine whether the image data received from the user device includes the match based at least in part on the determination of the potential match.

3. The system of claim 1, wherein:
the general classifier and the secondary classifier comprise convolutional neural networks.

4. The system of claim 1, wherein:
the secondary classifier is configured to use keypoint matching to determine whether the image data includes the match.

5. The system of claim 1, wherein:
the system is configured to generate training data using the pose estimation model, as least in part, by segmenting the object in a frame of the image data.

6. The system of claim 1, wherein:
the trainer is configured to generate specific classifiers in response to client input using a reinforcement learning model trained to generate classifier hyperparameters using a reward function based on classifier accuracy.

7. The system of claim 1, wherein:
the system further comprises a pre-processor configured to automatically determine whether to select and apply a preprocessing technique to the image data before providing the image data to the hierarchical classifier.

8. The system of claim 7, wherein:
the pre-processor comprises a reinforcement learning model; and
the trainer is further configured to train the pre-processor using a reward function based on a success or failure of the hierarchical classifier in identifying the match.

9. The system of claim 8, wherein:
the reward function is further based on a time required to identify the match.

10. The system of claim 1, wherein:
the system further comprises a selection engine configured to select, based on the match and in response to the identification of the match, a processing engine to generate an output from the image data.

11. The system of claim 10, wherein:
the trainer is further configured to train the selection engine using a reward function based on a degree of engagement of with provided outputs.

12. The system of claim 1, wherein:
the system is configured to store the image data when the secondary classifier or the hierarchical classifier determines that the image data includes the match.

13. A system for selectively processing image data, comprising:
a pre-processor configured to receive image data provided by a user device and automatically determine whether to select and apply a preprocessing technique to the image data;
a classifier configured to identify whether the image data received from the pre-processor includes a match to one of a plurality of triggers, the classifier trained at least in part using training data generated by tracking an object identified by the classifier in a video stream using a pose estimation model corresponding to at least a portion of the classifier;
a selection engine configured to select, based on the matched trigger and in response to the identification of the match, a processing engine; and
wherein the processing engine is configured to, in response to a selection of the processing engine:
generate an output using the image data; and
store the output or provide the output to the user device or a client system.

14. The system of claim 13, wherein:
the preprocessing technique includes at least one of denoising the image data, deblurring the image data, convolving the image data with a mask, applying the image data to an image enhancement machine learning model, or enhancing a resolution of the image data.

15. The system of claim 14, wherein:

the machine learning model comprises a neural network.

16. The system of claim 13, wherein:

the processing engine provides at least one of object pose estimation, object detection, object classification, object recognition, three-dimensional world reconstruction, three-dimensional object reconstruction, optical character recognition, object tracking, world tracking, or image recognition.

17. The system of claim 13, wherein:

the processing engine provides a payment application programing interface.

18. The system of claim 13, wherein:

the processing engine is further configured to provide instructions to modify a user interface of the user device for displaying the output.

19. The system of claim 13, wherein:

one or more of the plurality of triggers is specified by the client system.

20. The system of claim 13, wherein:

the one of the plurality of triggers is associated with at least one image, video, or object file provided by a client system; and the classifier is trained using the at least one image, video, or object file to identify the matched trigger by detecting a match to the at least one image, video, or object file.

21. The system of claim 13, wherein:

the image data is received from and the output provided to an application running on the user device.

22. The system of claim 21, wherein:

the application comprises a web browser.

23. The system of claim 13, wherein:

the system further comprises a control engine configurable, in response to instructions received from a client system, to specify the selection of the processing engine in response to matching the one of the plurality of triggers.

24. The system of claim 13, wherein:

the system is configured to provide the classifier to the user device for offline detection of triggers when a latency criterion for communications between the user device and the system is satisfied.

* * * * *